(12) United States Patent
Busaba et al.

(10) Patent No.: US 9,471,313 B1
(45) Date of Patent: Oct. 18, 2016

(54) FLUSHING SPECULATIVE INSTRUCTION PROCESSING

(71) Applicant: INTERNATIONAL BUSINESS MACHINES CORPORATION, Armonk, NY (US)

(72) Inventors: Fadi Y. Busaba, Poughkeepsie, NY (US); Michael K. Gschwind, Chappaqua, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/952,020

(22) Filed: Nov. 25, 2015

(51) Int. Cl.
*G06F 9/30* (2006.01)
*G06F 9/46* (2006.01)

(52) U.S. Cl.
CPC .......... *G06F 9/30058* (2013.01); *G06F 9/466* (2013.01); *G06F 9/467* (2013.01)

(58) Field of Classification Search
CPC ...................................................... G06F 9/467
USPC ........................................................ 712/225
See application file for complete search history.

(56) References Cited

U.S. PATENT DOCUMENTS

| 7,210,051 | B2 | 4/2007 | Patchen et al. | |
|---|---|---|---|---|
| 7,913,070 | B2 | 3/2011 | Abernathy et al. | |
| 7,949,681 | B2 | 5/2011 | Bodin et al. | |
| 9,075,621 | B2 | 7/2015 | Schon et al. | |
| 9,110,683 | B2 | 8/2015 | Gonion | |
| 9,110,691 | B2 | 8/2015 | Chung et al. | |
| 2011/0145512 | A1* | 6/2011 | Adl-Tabatabai | G06F 9/466 711/141 |
| 2011/0307689 | A1* | 12/2011 | Chung | G06F 9/3004 712/234 |
| 2012/0173848 | A1 | 7/2012 | Sun et al. | |
| 2012/0179877 | A1* | 7/2012 | Shriraman | G06F 9/524 711/141 |
| 2013/0091331 | A1* | 4/2013 | Moraru | G06F 12/126 711/143 |
| 2013/0339618 | A1* | 12/2013 | Alexander | G06F 12/0804 711/133 |
| 2013/0339975 | A1 | 12/2013 | Busaba et al. | |
| 2014/0195787 | A1 | 7/2014 | Scalabrino et al. | |
| 2015/0039868 | A1 | 2/2015 | Belmar et al. | |
| 2015/0052337 | A1 | 2/2015 | Greiner et al. | |
| 2015/0242238 | A1 | 8/2015 | Cain, III et al. | |
| 2015/0347137 | A1* | 12/2015 | Gschwind | G06F 9/467 712/239 |

OTHER PUBLICATIONS

Diestelhorst et al.; "Brief Announcement: Between All and Nothing-Versatile Aborts in Hardware Transactional Memory", 2013, pp. 108-110.
Tomic et al.; "EazyHTM: Eager-Lazy Hardware Transactional Memory", 2009. pp. 145-155.

* cited by examiner

*Primary Examiner* — Andrew Caldwell
*Assistant Examiner* — Michael Metzger
(74) *Attorney, Agent, or Firm* — Cantor Colburn LLP; William A. Kinnaman, Jr.

(57) ABSTRACT

Technical solutions are described for avoiding a transaction abort in a multiprocessor that supports transactional memory during out-of-order execution of an instruction stream. An example method described includes detecting an instruction that represents an end of a transaction in the instruction stream. The method also includes identifying a conflict in execution of an outside instruction in conjunction with execution of the transaction, the outside instruction being after instruction that represents the end of the transaction, and where the conflict causes the transaction to abort. The method also includes flushing the outside instruction; and resuming the execution of the transaction, without aborting the transaction.

19 Claims, 9 Drawing Sheets

FLUSHING SPECULATIVE INSTRUCTION PROCESSING

BACKGROUND

The present application relates to computer technology, and more specifically, to optimizing a processor.

A processor implements instructions that are received as a pipeline of instructions. To optimize implementation of the instructions, the processor may implement the instructions out of order. To this end, the processor fetches the instructions in an out-of-order manner and executes them in the out-of-order manner, as known to those skilled in the art.

SUMMARY

According to an embodiment, a method for avoiding a transaction abort in a multiprocessor that supports transactional memory during out-of-order execution of an instruction stream includes detecting an instruction that represents an end of a transaction in the instruction stream. The method also includes identifying a conflict in execution of an outside instruction in conjunction with execution of the transaction, the outside instruction being after the instruction that represents the end of the transaction, and where the conflict causes the transaction to abort. The method also includes flushing the outside instruction; and resuming the execution of the transaction, without aborting the transaction.

According to another embodiment, a system is described that includes a multiprocessor that supports transactional memory during out-of-order execution of an instruction stream. The multiprocessor avoids a transaction abort during the out-of-order execution of the instruction stream by being configured to detect an instruction that represents an end of a transaction in the instruction stream. The processor also identifies a conflict in execution of an outside instruction in conjunction with execution of the transaction, the outside instruction being after the instruction that represents the end of the transaction, and where the conflict causes the transaction to abort. The processor also flushes the outside instruction. The processor also resumes the execution of the transaction, without aborting the transaction.

According to another embodiment, a computer program product is described for avoiding a transaction abort in a multiprocessor that supports transactional memory during out-of-order execution of an instruction stream, the computer product including computer readable storage medium. The computer readable storage medium includes computer executable instructions. The computer readable storage medium includes instructions to detect an instruction that represents an end of a transaction in the instruction stream. The computer readable storage medium also includes instructions to identify a conflict in execution of an outside instruction in conjunction with execution of the transaction, the outside instruction being after the instruction that represents the end of the transaction, and where the conflict causes the transaction to abort. The computer readable storage medium also includes instructions to flush the outside instruction. The computer readable storage medium also includes instructions to resume the execution of the transaction, without aborting the transaction.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
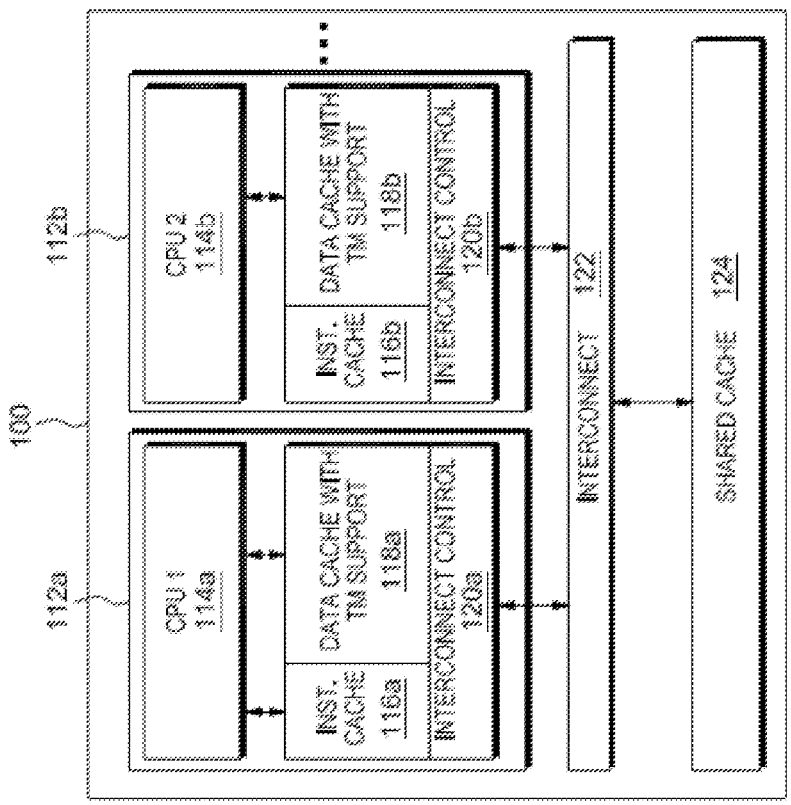
FIG. 1 illustrates an example transaction management system in accordance with an embodiment.

Software, and software developers (or programmers) take advantage of the multiple processor cores in a system to be able to run a software application or program efficiently across such multi-processors. Typically, however, throughput gains slow considerably as a program is run on more and more processors in parallel. It can reach a point where throughput stops growing and beings to decline due to contention for semaphores or locks used to protect shared data from conflicting accesses and to synchronize operations across these processes. One solution to this problem is a technology known as transactional memory. Transactional memory is supported in processors, for example IBM's zEC12 microprocessor, to enhance execution performance.

Disclosed herein are technical solutions for optimizing a processor, such as a processor that implements instructions in an out-of-order manner. The out-of-order implementation enables the processor to execute instructions outside a transaction while the instructions inside the transaction are still in the process of being implemented. Instructions outside a transaction, in an example, may be younger than the instruction marking the end of a transaction, or in other words, the outside instruction sequentially follows (or is after) the end of the transaction. Such an overlap causes the transaction to abort due to cache access conflicts, footprint overloads, or other resource constrains. The technical solutions described herein, facilitates the processor to implement a hardware flush for an instruction and/or a memory access after the end of the transaction. Thus, upon detection of a potential abort condition, the processor automatically flushes the instruction and/or memory access after the transaction ending instruction. The processor further prevents future speculative execution of instructions after the transaction ending instruction.

A transaction is a group of instructions that is implemented atomically and in isolation (sometimes called "serializability"). The instructions in the transaction, typically operate on a data structure in memory. The transaction, in an example, executes optimistically without obtaining a lock, but may need to abort and retry if the operation conflicts with other operations that refer to the same memory locations, as the instructions in the transaction.

A central processing unit (CPU) that includes multiple CPU cores that are connected to a shared memory facilitate execution of multithreaded applications that support increasing workload on a computer system. However, writing multi-threaded applications requires programmers to reason about data sharing among multiple threads, and access to shared data typically requires synchronization mechanisms. Therefore, CPUs use transactional synchronization to take advantage of concurrency that may exist in the instructions of the applications that are executing. For example, Intel® Transactional Synchronization Extensions (Intel® TSX) allow the processor to determine dynamically whether threads need to serialize through lock-protected critical sections, and to perform serialization only when required. This lets the processor to expose and exploit concurrency hidden in an application due to dynamically unnecessary synchronization.

Using the dynamic synchronization, such as Intel TSX, the CPU executes programmer-specified code regions (also referred to as transactional regions) transactionally. That is, if the transactional execution completes successfully, then all memory operations performed within the transaction appear to have occurred instantaneously when viewed from other processors within the CPU. A processor makes architectural updates performed within the transaction visible to other processors in the CPU only on a successful commit, a process referred to as an atomic commit.

A CPU provides keywords, instructions, or other ways to specify regions of a program, that is a group of instructions, to be implemented as a transaction. For example, in Intel TSX, Hardware Lock Elision (HLE) is a legacy compatible instruction set extension (comprising the XACQUIRE and XRELEASE prefixes) to specify transactional regions. Restricted Transactional Memory (RTM) is another example instruction set interface (comprising the XBEGIN, XEND, and XABORT instructions) for programmers to define transactional regions in a more flexible manner than that possible with HLE. For example, programmers may use HLE for backward compatibility of the conventional mutual exclusion programming model so as to execute HLE-enabled software on legacy hardware without transactional execution, as well as on recent hardware that facilitates lock elision capabilities via HLE support. Alternatively or in addition, programmers may use RTM as a flexible interface to the transactional execution hardware. In an example, the CPU provides an instruction to query whether a processor of the CPU is transactionally executing in a transactional region, such as an XTEST instruction in Intel TSX.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, the optimistic execution fails. When this happens, the processor will roll back the execution, a process referred to as a transactional abort. On a transactional abort, the processor will discard all updates performed in the region, restore architectural state to appear as if the optimistic execution never occurred, and resume execution non-transactionally.

A processor can perform a transactional abort for numerous reasons. For example, due to conflicting accesses between a processor that is executing the transaction and logical processor. Such conflicting accesses may prevent a successful completion of the transactional execution. Memory addresses read from within the transaction constitute a read-set of the transaction and addresses written to within the transaction constitute a write-set of the transaction. The CPU maintains the read- and write-sets at the granularity of a cache line. A conflicting access occurs if another processor either reads a location that is part of the transaction's write-set or writes to a location that is a part of either the read- or write-set of the transaction. A conflicting access typically leads to serialization of the code region. Since the CPU, such as the CPU using Intel TSX, detects data conflicts at the granularity of a cache line, unrelated data locations placed in the same cache line will be detected as conflicts.

Transactional aborts may also occur due to limited transactional resources. For example, the amount of data accessed in the region may exceed an implementation-specific capacity. Additionally, an instruction and/or system event may cause a transactional abort. Frequent transactional aborts cause wasted cycles.

The CPU that uses hardware lock elision (HLE) to specify a transactional region uses prefix hints such as XACQUIRE and XRELEASE. A programmer uses the XACQUIRE prefix in front of the instruction that is used to acquire the lock that is protecting the critical section, that is, instructions within the transaction. The CPU treats the indication as a hint to elide the write associated with the lock acquire operation. Even though the lock acquire has an associated write operation to the lock, the CPU does not add the address of the lock to the transactional region's write-set nor does it issue any write requests to the lock. Instead, the address of the lock is added to the read-set. The processor executing the critical section enters transactional execution. If the lock was available before the XACQUIRE prefixed instruction, all other processors will continue to see it as available afterwards. Since the transactionally executing processor neither added the address of the lock to its write-set nor performed externally visible write operations to it, other logical processors can read the lock without causing a data conflict. This allows the other processors to also enter and concurrently execute the critical section protected by the lock. The CPU automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, that is, the read will return the non-elided value. This behavior makes an HLE execution functionally equivalent to an execution without the HLE prefixes.

The programmer uses the XRELEASE prefix in front of the instruction that is used to release the lock protecting the critical section. This involves a write to the lock. If the instruction is restoring the value of the lock to the value it had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, it will execute the region non-transactionally and without elision. HLE enabled software has the same forward progress guarantees as the underlying non-HLE lock-based execution. Hardware without HLE support ignores the XACQUIRE and XRELEASE prefix hints and does not perform any elision. An application may identify if the CPU supports HLE execution, for example if CPUID.07H.EBX.HLE [bit 4]=1. However, an application can use the HLE prefixes (XACQUIRE and XRELEASE) without checking whether the CPU supports HLE as processors without HLE support ignore these prefixes and will execute the code without entering transactional execution.

In case of a CPU that supports RTM, the CPU provides a flexible software interface for transactional execution using three instructions—XBEGIN, XEND, and XABORT—for programmers to start, commit, and abort a transactional execution. The programmer uses the XBEGIN instruction to specify the start of the transactional code region and the XEND instruction to specify the end of the transactional code region. The XBEGIN instruction takes an operand that provides a relative offset to the fallback instruction address if the RTM region could not be successfully executed transactionally. A processor may abort RTM transactional execution for many reasons. The hardware automatically detects transactional abort conditions and restarts execution from the fallback instruction address with the architectural state corresponding to that at the start of the XBEGIN instruction and the EAX register updated to describe the abort status.

The XABORT instruction allows programmers to abort the execution of an RTM region explicitly. The XABORT instruction takes an 8 bit immediate argument that is loaded into the EAX register and will thus be available to software following an RTM abort. RTM instructions do not have any data memory location associated with them. The programmer also provides an alternative code sequence in the fallback path to guarantee forward progress, in case the transaction execution fails. For example, the alternative code sequence may include acquiring a lock and executing the specified code region non-transactionally. Further, a transaction that always aborts on a given implementation may complete transactionally on a future implementation. Therefore, programmers typically ensure that the code paths for the transactional region and the alternative code sequence are functionally tested.

An application may determine if the CPU supports RTM execution, for example if CPUID.07H.EBX.RTM [bit 11]=1. If an application uses the RTM instructions (XBEGIN, XEND, XABORT), without checking if they are supported, the instructions generate a #UD exception if the CPU does not support RTM.

Further, the CPU supports the XTEST instruction if it supports either HLE or RTM. The XTEST instruction generates a #UD exception when used on a CPU that does not support either HLE or RTM. The XTEST instruction facilitates querying transactional execution status, and to determine the transactional status of a transactional region specified by HLE or RTM. While the HLE prefixes are ignored on processors that do not support HLE, the XTEST instruction will generate a #UD exception when used on processors that do not support either HLE or RTM.

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one monolithic transaction.

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied the requirements described earlier. If execution cannot commit atomically, then execution transitions to a non-transactional execution without elision as if the first instruction did not have an XACQUIRE prefix.

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements it. The logical processor attempts to commit only if the nesting count becomes zero. A transactional abort occurs if the nesting count exceeds MAX_RTM_NEST_COUNT.

HLE and RTM provide two alternative software interfaces to a common transactional execution capability. The behavior when HLE and RTM are nested together—HLE inside RTM or RTM inside HLE—is implementation specific. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

The CPU uses a register to communicate abort status. For example, RTM uses the EAX register to communicate abort status to software. Example status of EAX register following an RTM abort are listed in Table 1. The EAX abort status for RTM only provides causes for aborts. It does not by itself encode whether an abort or commit occurred for the RTM region. The value of EAX can be 0 following an RTM abort.

For example, a CPUID instruction when used inside an RTM region causes a transactional abort and may not satisfy the requirements for setting any of the EAX bits. This may result in an EAX value of 0.

TABLE 1

| EAX Register Bit Position | Meaning |
|---|---|
| 0 | Set if abort caused by XABORT instruction. |
| 1 | If set, the transaction may succeed on a retry. This bit is always clear if bit 0 is set. |
| 2 | Set if another logical processor conflicted with a memory address that was part of the transaction that aborted. |
| 3 | Set if an internal buffer overflowed. |
| 4 | Set if a debug breakpoint was hit. |
| 5 | Set if an abort occurred during execution of a nested transaction. |
| 23:6 | Reserved. |
| 31:24 | XABORT argument (only valid if bit 0 set, otherwise reserved). |

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, all memory updates from within the RTM region are discarded and never made visible to any other logical processor.

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability. If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Typical programmer-identified regions are expected to transactionally execute and commit successfully. However, a transactional execution may abort for many reasons. The CPU architecture ensures that updates performed within a transaction that subsequently aborts execution will never become visible. Only a committed transactional execution updates architectural state. Transactional aborts never cause functional failures and only affect performance.

The CPU facilitates programmers to use any instruction safely inside a transaction (HLE or RTM) and can use transactions at any privilege level. However, some instructions abort the transactional execution and cause execution to seamlessly and safely transition to a non-transactional path. Using the following operations inside a transaction do not typically cause an abort: Operations on the instruction pointer register, general purpose registers (GPRs) and the status flags (CF, OF, SF, PF, AF, and ZF); and operations on XMM and YMM registers and the MXCSR register However, intermixing SSE and AVX operations inside a transactional region may cause a transactional abort. Intermixing SSE instructions accessing XMM registers and AVX instructions accessing YMM registers may cause transactions to abort. Use of REP/REPNE prefixed string operations inside transactions may succeed in an example. However, long strings may cause aborts. Further, the use of CLD and STD instructions may cause aborts if they change the value of the DF flag. However, if DF is 1, the STD instruction will not cause an abort. Similarly, if DF is 0, the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, among others).

The following instructions abort transactional execution on any implementation: XABORT, CPUID, and PAUSE. In addition, in some implementations, the following instructions may cause transactional aborts. Operations on X87 and MMX architecture state, such as MMX and X87 instructions, including the FXRSTOR and FXSAVE instructions; update to non-status portion of EFLAGS, such as CLI, STI, POPFD, POPFQ, CLTS. Instructions that update segment registers, debug registers and/or control registers, such as MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW. Ring transitions such as SYSENTER, SYSCALL, SYSEXIT, and SYSRET. TLB and Cacheability control, such as CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ). Processor state save instructions such as XSAVE, XSAVEOPT, and XRSTOR. Interrupts such as INTn, INTO. • IO: IN, INS, REP INS, OUT, OUTS, REP OUTS and their variants. VMX instructions such as VMPTRLD, VMPTRST, VMCLEAR, VMREAD, VMWRITE, VMCALL, VMLAUNCH, VMRESUME, VMXOFF, VMXON, INVEPT, and INVVPID. SMX instruction GETSEC. Instructions such as UD2, RSM, RDMSR, WRMSR, HLT, MONITOR, MWAIT, XSETBV, VZEROUPPER, MASKMOVQ, and V/MASKMOVDQU.

In addition to the instruction-based considerations, runtime events may cause transactional execution to abort. These may be due to data access patterns or microarchitectural implementation causes.

Any fault or trap in a transaction that must be exposed to software will be suppressed. Transactional execution will abort and execution will transition to a nontransactional execution, as if the fault or trap had never occurred. If any exception is not masked, that will result in a transactional abort and it will be as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a nontransactional execution. The asynchronous events will be pended and handled after the transactional abort is processed.

Transactions only support write-back cacheable memory type operations. A transaction may always abort if it includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. While an implementation of RTM and HLE will typically provide sufficient resources for executing common transactional regions, implementation constraints and excessive sizes for transactional regions may cause a transactional execution to abort and transition to a non-transactional execution.

Conflicting requests to a cache line accessed within a transactional region may prevent the transaction from executing successfully. For example, if logical processor P0 reads line A in a transactional region and another logical processor P1 writes A (either inside or outside a transactional region) then logical processor P0 may abort if logical processor P1's write interferes with processor P0's ability to execute transactionally.

Similarly, if P0 writes line A in a transactional region and P1 reads or writes A (either inside or outside a transactional region), then P0 may abort if P1's access to A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated herein by reference, fundamentally, there are three mechanisms needed to implement an atomic and isolated transactional region: versioning, conflict detection, and contention management.

To make a transactional code region appear atomic, all its modifications must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The system detects conflicts by implementing a conflict detection policy, either optimistic or pessimistic. An optimistic system executes transactions in parallel, checking for conflicts only when a transaction commits. Pessimistic systems check for conflicts at each load and store. Similar to versioning, conflict detection also uses the cache, marking each line as either part of the read-set, part of the write-set, or both. The system resolves conflicts by implementing a contention management policy. Many policies exist, some more appropriate for optimistic conflict detection and some more appropriate for pessimistic.

FIG. 1 depicts a multicore transactional memory system 100. In an example, the TM system 100 is a multiprocessor. In another example, the multiprocessor may be used in a server computer, a desktop computer, a laptop computer, a tablet computer, a smartphone, or any other computing system. The TM system 100 includes multiple cores 112A and 112B connected with an interconnect 122, which is connected to a shared cache 124. In another example, the TM system 100 includes a different number of cores than illustrated. Each core of the TM system 100 may be a transactional processor. Each core 112A and 112B includes a processor, such as a central processing unit (CPU) 114A and 114B. Each of the processors 114a and 114b may be a central processing unit, an application specific integrated circuit (ASIC), a digital signal processor, a field programmable gate array (FPGA), a digital circuit, an analog circuit, or combinations thereof. In an example, the processors 114a and 114b are TM-enabled and on a single die. Each processor includes instructional caches 116a-116b, data caches 118a-118b, and interconnect controls 120a-120b, to support transactional memory operations.

Figure 2:
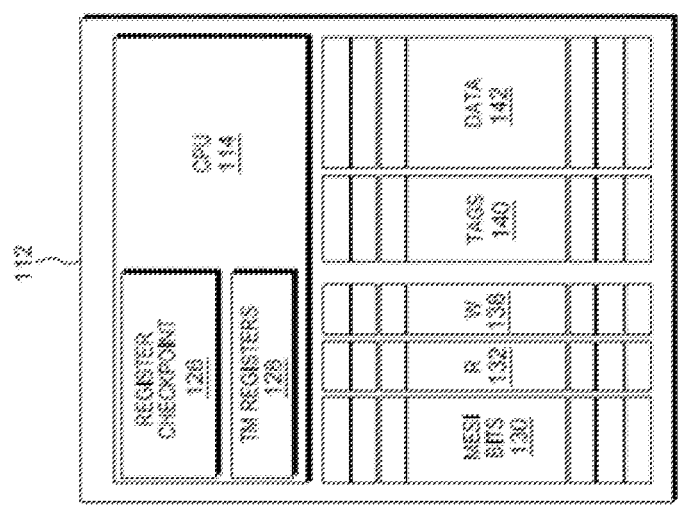
FIG. 2 illustrates components of a processor that supports transactional memory in accordance with an embodiment.

FIG. 2 illustrates details of the components of a processor 112 that supports transactional memory. For example, the transactional processor 112 includes a register checkpoint 126, TM registers 128, MESI bits 130, R cache bits 132, W cache bits 138, Tags 140, and data 142. The processor 112 may be a general processor, central processing unit, server, application specific integrated circuit (ASIC), digital signal processor, field programmable gate array (FPGA), digital circuit, analog circuit, or combinations thereof.

Transactional accesses among individual processors 112a and 112b in the TM system 100 are screened from each other using the above components. The TM system 100, in an example, implements a strong isolation (sometimes called strong atomicity) when every non-transactional load and store acts like an atomic transaction. Therefore, nontransactional loads cannot see uncommitted data and non-transactional stores cause atomicity violations in any transactions that have read that address. Alternatively or in addition, the TM system 100 implements a weak isolation (sometimes called weak atomicity). Strong isolation is typically desired because it is easier to reason about. Additionally, the programmer may miss surrounding a shared memory reference with transactions, causing programming errors (bugs). With strong isolation, the programmer will detect such programming errors using a debug interface when a non-transactional region causes atomicity violations. Also, programs written in one model may work differently on another model.

Strong isolation is supported in hardware TM based on a coherence protocol. The protocol manages load and store communication between processors. Transactions detect non-transactional loads and stores and act appropriately. To implement strong isolation in software TM, non-transactional code is modified to include read- and write-barriers, potentially crippling performance. Therefore, hardware based TM are more efficient than software based TM.

Eager-Pessimistic (EP)

In an example, the TM system 100 is an Eager-Pessimistic (EP) system. An EP system stores its write-set "in place" (hence the name "eager") and, to support rollback, stores the old values of overwritten lines in an "undo log". Processors 114a-114b use the W 138 and R 132 cache bits to track read and write-sets and detect conflicts when receiving snooped load requests. LogTM and UTM are example EP systems. Beginning a transaction in an EP system is much like beginning a transaction in other systems: tm_begin( ) takes a register checkpoint and initializes any status registers. An EP system also requires initialing the undo log, the details of which are dependent on the log format, but probably involves initializing a log base pointer to a region of preallocated, thread-private memory and clearing a log bounds register.

Versioning: In an EP system, the MESI 130 state transitions are left mostly unchanged due to the way eager versioning works. Of course, outside a transaction, MESI 130 is completely unchanged.

When reading a line inside a transaction, the coherence transitions according to the MESI protocol apply (S!S, I!S, or I!E), issuing a load miss as needed, but the R bit 132 is also set. Likewise, writing a line applies the transitions (S!M, E!I, I!M), issuing a miss as needed, but also sets the W bit 138. The first time a line is written, the old version of the entire line is loaded then written to the undo log to preserve it in case the current transaction aborts.

The newly written data is then stored "in-place," over the old data. Table 2 depicts combinations for detecting conflicts in transactional memory (versioning and conflict detection).

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Conflict Detection: Pessimistic conflict detection uses coherence messages exchanged on misses or upgrades to look for conflicts between transactions.

When a read miss occurs within a transaction, other processors receive a load request. Of course, they ignore the request if they do not have the line. If they have it non-speculatively or have the line R, they downgrade their line to S and perhaps issue a cache-to-cache transfer if they have the line in MESI's M or E state. But if the cache has the line W, then a conflict is detected between the two transactions and some action must be taken immediately.

Similarly, when a transaction seeks to upgrade a line from shared to modified (on its first write), it issues an exclusive load request, which is also used to detect conflicts. If a receiving cache has the line non-speculatively, they invalidate it and perhaps issue a cache-to-cache transfer (M or E states). But, if the line is R or W, a conflict is detected.

Validation: Because conflict detection is performed on every load, a transaction always has exclusive access to its write-set. Therefore, validation does not require any additional work.

Commit: Since eager versioning stores the new version of data items in place, the commit process simply clears the W 138 and R 132 bits and discards the undo log (this is very fast).

Abort: When a transaction rolls back, the original version of each cache line in the undo log must be restored, a process called "unrolling" or "applying" the log. This is done during tm_discard( ) and must be atomic with regard to other transactions. Specifically, the write-set is used to detect conflicts: this transaction has the only correct version of lines in its undo log and requesting transactions must wait for the correct version to be restored from the log. The log can be applied using a hardware state machine or software abort handler.

Advantages: Commit is simple and since it is in-place, very fast. Similarly, validation is a no-op. Pessimistic detects conflicts early, as shown in Table 2, avoiding "doomed" transactions: T0 and T1 are involved in a Write-After-Read dependency which is detected immediately in pessimistic conflict detection, but not until the writer commits in optimistic. Disadvantages: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing. T0 reads a line and T1 later writes to the same line. When T1 attempts to upgrade its line to M, it detects a conflict and aborts T0. But, a serializable schedule exists for these transactions (namely T0, T1), and is allowed by optimistic conflict detection. Additionally, because conflicts are handled as they occur, there is a potential for livelock and careful contention management mechanisms must be employed to guarantee forward progress.

Lazy-Optimistic (LO)

In another example, the TM system 100 is a Lazy-Optimistic (LO) TM system, which stores its write-set in a "write buffer" or "redo log" and detects conflicts at commit time (still using the R 132 and W 138 bits). An LO system exploits different tradeoffs than an EP system, and has been chiefly advocated by the TCC system. Versioning: Just as in the EP system, the MESI protocol is enforced outside of transactions. Once inside a transaction, reading a line incurs the standard MESI transitions but also sets the R 132 bit. Likewise, writing a line sets its W 138 bit, but handling the MESI transitions is different. First, with lazy versioning, the new versions of written data are stored in the cache hierarchy until commit while other transactions have access to old versions available in memory or other caches. To make available the old versions, dirty lines must be evicted when first written by a transaction. Second, no upgrade misses are needed because of optimistic conflict detection: if a transaction has a line in the S state, it can simply write to it and upgrade to M without communicating with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the committer's cache and marked dirty (M). To build this packet without searching the cache for lines marked W, the system 100 uses a simple bit vector, called a "store buffer," with one bit per cache line to track these speculatively modified lines. Other transactions use this address packet to detect conflicts: if an address is found in the cache and the R 132 and/or W 138 bits are set, a conflict is initiated. If the line is found but neither R 132 nor W 138 is set, the line is simply invalidated, like processing an exclusive load.

Of course, to support transaction atomicity, these address packets are handled atomically, that is, no two address packets may exist at once with the same addresses. In an example LO system, a global commit token is acquired before sending the address packet. In another example LO system, a two-phase commit scheme is employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, the system 100 invalidates these lines then clear W 138 and R 132 bits and the store buffer. The store buffer allows the system 100 to find W lines to invalidate without the need to search the cache. Advantages: Aborts are very fast, requiring no additional loads or stores and making only local changes. More serializable schedules can exist, compared to an EP system, which facilitates an LO system to more aggressively speculate that transactions are independent, improving performance. Finally, late detection of conflicts makes guaranteeing forward progress easier. Disadvantages: Validation takes global communication time proportional to size of write set. Doomed transactions can waste work since conflicts are detected only at commit time.

Lazy-Pessimistic (LP)

In yet another example, the TM system 100 is a Lazy-Pessimistic (LP) system. In this example, the TM system 100 stores newly written lines in a write buffer but detects conflicts on a per access basis. Versioning: Versioning is similar but not identical to that of LO: reading a line sets its R bit 132, writing a line sets its W bit 138, and a store buffer is used to track W lines in the cache. Also, dirty lines are evicted when first written by a transaction, just as in LO. However, since conflict detection is pessimistic, load exclusives are performed when upgrading a transactional line from I, S!M, unlike in LO. Conflict Detection: LP's conflict detection operates the same as EP's: using coherence messages to look for conflicts between transactions. Validation: Like in EP, pessimistic conflict detection ensures that at any point, a running transaction has no conflicts with any other running transaction, so validation is a no-op. Commit: The LP system clears the W 138 and R 132 bits and the store buffer, like in LO.

Abort: Rollback is also like that of LO: the LP invalidates the write-set using the store buffer and clears the W 138 and R 132 bits and the store buffer.

Eager-Optimistic (EO)

In yet another example, the TM system 100 uses a combination of versioning and conflict detection referred to as Eager-Optimistic (EO). In EO new transactional versions are written in-place, other transactions have no choice but to notice conflicts as they occur (that is, as cache misses occur). EO waits until commit time to detect conflicts, and hence the transactions become "zombies," continuing to execute, wasting resources, and are doomed to abort. Hence, an EO system is typically, not used as a hardware TM system but for software TM system, for example, Bartok-STM and McRT. A lazy versioning software TM checks its write buffer on each read to ensure that it is reading the most recent value. Since the write buffer is not a hardware structure, this is expensive, hence the preference for write-in-place eager versioning. Additionally, since checking for conflicts is also expensive in software TM, optimistic conflict detection offers the advantage of performing this operation in bulk.

Contention Management

As described herein, a transaction rolls back once the system has decided to abort the transaction but, since a conflict involves two transactions, the system uses contention management policy (CMP) to determine which one to abort, how the abort is to be initiated, and when the aborted transaction is to be retried.

For example, retrying immediately does not lead to the best performance, but employing some back off mechanism might improve the performance. Policies draw on a number of measures to make their decisions, including ages of the transactions, size of read- and write-sets, the number of previous aborts, and other such factors. Combinations are endless, but certain combinations have been empirically found useful. To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender is the transaction receiving the attacker's request. The Aggressive policy immediately and always retries either the attacker or the defender. In LO, Aggressive means that the attacker always wins, and so Aggressive is sometimes called committer wins. For EP, aggressive can be either defender wins or attacker wins.

Restarting a conflicting transaction that will immediately experience another conflict is bound to waste work—namely interconnect bandwidth refilling cache misses. The Polite policy employs exponential backoff (but linear could also be used) before restarting conflicts. To prevent starvation, transaction succeeds after at least n retries.

In an example, the TM system randomly aborts the attacker or defender (a policy called Randomized). Such randomized policy may be combined with a randomized backoff scheme to avoid contention. According to another example CMP, the TM system avoids aborting transactions that have done "a lot of work." One measure of work is a transactions age. For example, the age is determined based on a timestamp method that aborts the younger transaction in a conflict. For example, Bulk TM uses such a timestamp scheme. In another example referred to as Size Matters the work is measured based on a number of read/written words. The transaction with fewer number of read/written words is aborted. In yet another example, the CMP reverts to Oldest after a fixed number of aborts. Another example CMP, known as Karma is similar, using the size of the write-set as priority. Rollback then proceeds after backing off a fixed amount of time. Aborted transactions keep their priorities after being aborted (hence the name Karma). A CMP known as Polka works like Karma but instead of backing off a predefined amount of time, it backs off exponentially more each time.

Since aborting wastes work, stalling an attacker until the defender has finished their transaction leads to a better performance compared to aborting the attacker. However stalling the attacker may lead to deadlock, such in an example where T0 reads X, T1 reads Y, T0 tries to write Y, stalls on T1, while T1 tries to write X, and stalls on T0.

Deadlock avoidance techniques are used to solve this problem. For example, the TM system uses a Greedy scheme, which uses two rules to avoid deadlock: First, if T1 has lower priority than T0, or if T1 is waiting for another transaction, then T1 aborts when conflicting with T0. Second, If T1 has higher priority than T0 and is not waiting, then T0 waits until T1 commits, aborts, or starts waiting (in which case the first rule is applied). The Greedy scheme provides some limits about time bounds for executing a set of transactions. An example EP system known as LogTM uses a CMP similar to Greedy to achieve stalling with conservative deadlock avoidance. Of course, there are several other examples of contention management policies, which the TM system uses in other examples.

MESI coherency rules provide for four possible states in which a cache line of a multiprocessor cache system may reside, M, S, E, I defined as follows.

Modified: The cache line is present only in the current cache, and is dirty; it has been modified from the value in main memory. The cache writes the data back to main memory at some time in the future, before permitting any other read of the (no longer valid) main memory state. The write-back changes the line to the Exclusive state.

Exclusive: The cache line is present only in the current cache, but is clean; it matches main memory. It may be changed to the Shared state at any time, in response to a read request. Alternatively, it may be changed to the Modified state when writing to it.

Shared: Indicates that this cache line may be stored in other caches of the machine and "is clean"; it matches the main memory. The line may be discarded (changed to the Invalid state) at any time.

Invalid: Indicates that this cache line is invalid (unused).

In another aspect of TM design, a system is designed using transactional store buffers. For example, U.S. Pat. No. 6,349,361 "Methods and apparatus for reordering and renaming memory references in a multiprocessor computer system", filed Feb. 19, 2002 and incorporated herein by reference teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The implementation components of one such transactional memory facility are a transaction-backup register file for holding pre-transaction GR content, a cache directory to track the cache lines accessed during the transaction, a store cache to buffer stores until the transaction ends, and firmware routines to perform various complex functions. A detailed description of the implementation follows, using IBM™ enterprise server as an example. Of course, any other system equipped with a multiprocessor can be used in other examples. The examples are described, at least in part in a paper "Transactional Memory Architecture and Implementation for IBM System Z" of Proceedings Pages 25-36 presented at MICRO-45, 1-5 Dec. 2012/Vancouver, British Columbia, Canada and available from IEEE Computer Society Conference Publishing Services (CPS). "Transactional Memory Architecture and Implementation for IBM System Z" which are incorporated herein in entirety, by reference.

In an IBM™ enterprise server, transactions start with TBEGIN are not assured to ever successfully complete with TEND, since they can experience an aborting condition at every attempted execution, for example due to repeating conflicts with other CPUs. Hence, the program supports a fallback path to perform the same operation non-transactionally, such as by using traditional locking schemes. This puts significant burden on the programming and software verification teams, especially where the fallback path is not automatically generated by a reliable compiler.

The requirement of providing a fallback path for aborted Transaction Execution (TX) transactions are onerous. Many transactions operating on shared data structures are expected to be short, touch only few distinct memory locations, and use simple instructions only. For those transactions, the system, such as an IBM zEnterprise EC12™, introduces constrained transactions. For example, typically, the CPU executes a constrained transaction to eventually end successfully, albeit without a strict limit on a number of retries. In an example, the constrained transaction starts with a identifier keyword, such as TBEGINC instruction and ends with a another keyword identifier, such as TEND. Implementing a task as constrained or non-constrained transaction typically results in comparable performance, but constrained transactions simplify software development by removing the need for a fallback path. Further, the system, such as the zEnterprise® EC12 server, which uses constrained transactions, can guarantee that the transaction will succeed.

Consider an example constrained transaction in an IBM™ enterprise server, such as the IBM zEnterprise EC12. A constrained transaction starts with the TBEGINC instruction. A transaction initiated with TBEGINC follows a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (hence no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that common operations like doubly linked list-insert/delete operations can be performed, including the concept of atomic compare-and-swap targeting up to 4 aligned octowords. Further, the constraints facilitate the CPU to complete the transaction successfully without adjusting the constraints, since that would otherwise lead to software incompatibility.

The TBEGINC operates similar to the XBEGIN in TSX or TBEGIN on IBM's zEC12 servers, except that the FPR control and the program interruption filtering fields do not exist and the controls are considered to be zero. On a transaction abort, the instruction address is set back directly to the TBEGINC instead to the instruction after, reflecting the immediate retry and absence of an abort path for constrained transactions.

Nested transactions are not allowed within constrained transactions, but if a TBEGINC occurs within a nonconstrained transaction it is treated as opening a new nonconstrained nesting level like TBEGIN. This can occur, for example, if a non-constrained transaction calls a subroutine that uses a constrained transaction internally. Since interruption filtering is implicitly off, all exceptions during a constrained transaction lead to an interruption into the operating system (OS). Eventual successful finishing of the transaction of course relies on the capability of the operating system (OS) to page-in the at most 4 4 Kbyte pages touched by any constrained transaction. The OS, additionally, allocates time-slices long enough to allow the transaction to complete.

Figure 3:
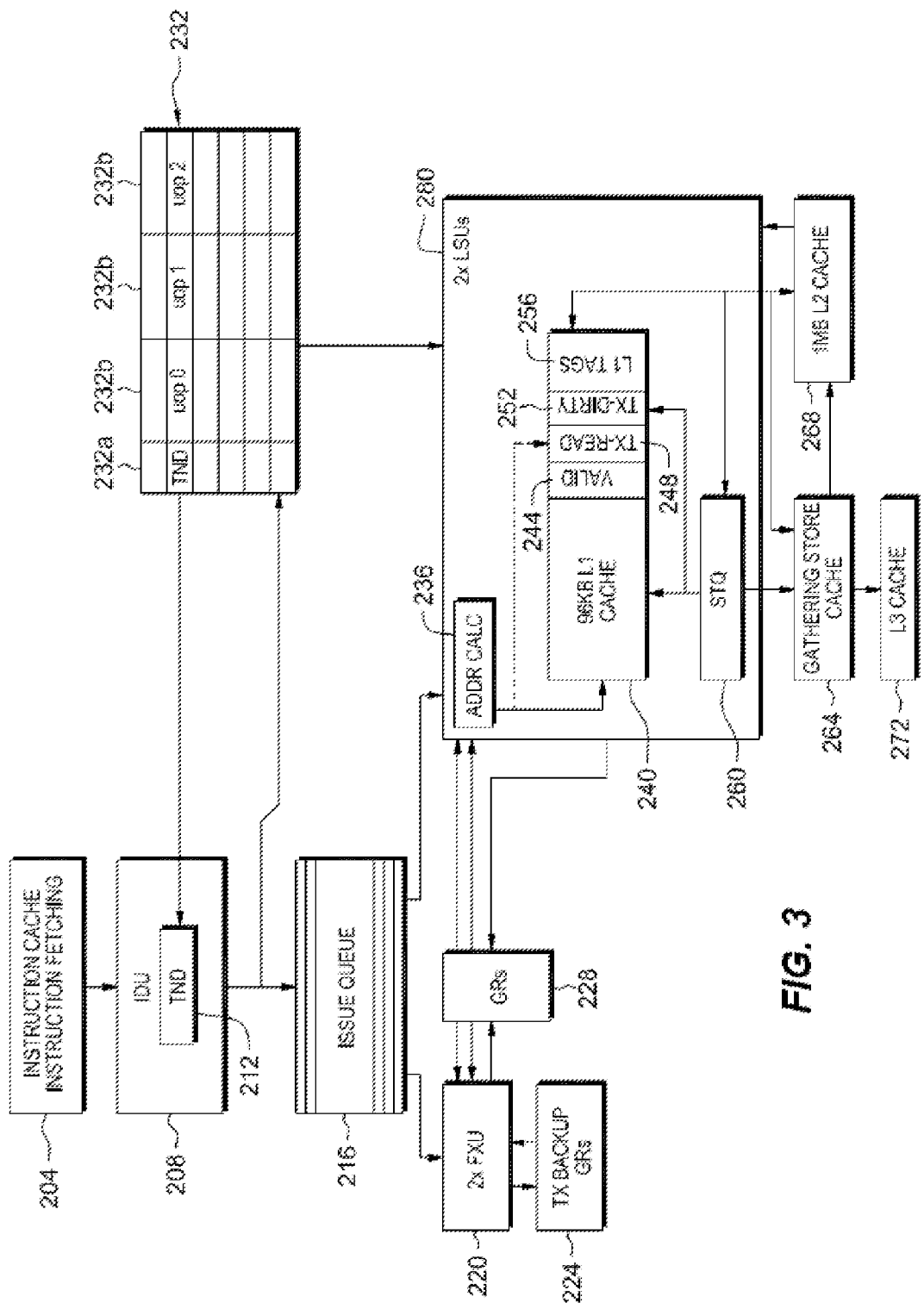
FIG. 3 illustrates a transactional memory system implementing a constrained-transactional in accordance with an embodiment.

FIG. 3 illustrates a transactional memory system 100 implementing a constrained-transactional of the code in Table 3. In this case, it is assumed that the constrained transactions do not interact with other locking-based code. No lock testing is shown therefore, but could, of course, be added if constrained transactions and lock-based code were mixed. When failure occurs repeatedly, software emulation is performed using millicode as part of system firmware. Advantageously, constrained transactions have desirable properties because of the burden removed from programmers.

TABLE 3

| | LHI | R0,0 | *initialize retry count=0 |
|---|---|---|---|
| loop | TBEGIN | | *begin transaction |
| | JNZ | abort | *go to abort code if CC!=0 |
| | LT | R1,lock | *load&test the fallback lock |
| | JNZ | lckbzy | *branch if lock busy |
| | ...perform operation... | | |
| | TEND | | *end transaction |
| | ... | | |
| lckbzy | TABORT | | *abort if lock busy; this |
| | | | *resumes after TBEGIN |
| abort | JO | fallback | *no retry if CC=3 |
| | AHI | R0,1 | *increment retry count. |
| | CIJNL | R0,6,fallback | *give up after 6 attempts |
| | PPA | R0,TX | *random delay based on |
| | | | *retry count |
| | ...potentially wait for lock to become free | | |
| | J | loop | *jump back to retry |
| fallback | | | |
| | OBTAIN | lock | *using Compare&Swap |
| | ...perform operation... | | |
| | RELEASE | lock | |
| | ... | | |

In an example, the processor, such as the IBM zEnterprise EC12™ processor, an instruction decode unit (IDU) fetches and decodes 3 instructions per clock cycle, as shown at block 204. The IDU dispatches instructions as single micro-ops, or divides the instructions into multiple micro-ops. The microops (Uops) are written into a unified issue queue 216, from where they can be issued out-of-order. Up to two fixed-point, one floating-point, two load/store, and two branch instructions can execute every cycle. A Global Completion Table (GCT) 232 holds every micro-op. The GCT is written in-order at decode time, tracks the execution status of each micro-op, and completes instructions when all micro-ops of the oldest instruction group have successfully executed.

In an example, the level 1 (L1) data cache 240 is a 96 KB (kilo-byte) 6-way associative cache with 256 byte cache-lines and 4 cycle use latency, coupled to a private 1 MB (mega-byte) 8-way associative L2 2nd-level data cache 268 with 7 cycles use-latency penalty for L1 misses. L1 cache is the cache closest to a processor and Ln cache is a cache at the nth level of caching. In an example, both L1 and L2 caches are store-through. Six cores on each central processor (CP) chip share a 48 MB 3rd-level store-in cache 272, and six CP chips are connected to an off-chip 384 MB 4th-level cache (not shown), packaged together on a glass ceramic multi-chip module (MCM). Up to 4 multi-chip modules (MCMs) can be connected to a coherent symmetric multi-processor (SMP) system with up to 144 cores (not all cores are available to run customer workload). Of course, the sizes and configuration of the processor may be different in different examples.

Coherency is managed with a variant of the MESI protocol. Cache-lines can be owned read-only (shared) or exclusive; the L1 240 and L2 268 are store-through and thus do not contain dirty lines. The L3 272 and L4 caches are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2/L1 268 and 240 under that L3 272 to ensure coherency, before it returns the cache line to the requestor. If the request also misses the L3 272, the L3 272 sends a request to the L4 which enforces coherency by sending XIs to all necessary L3s 272 under that L4, and to the neighboring L4s. Then the L4 responds to the requesting L3 272 which forwards the response to the L2/L1 268 and 240.

Since the cache hierarchy is inclusive, cache lines are XI'ed from lower-level caches due to evictions on higher-level caches caused by associativity overflows from requests to other cache lines. The XIs are referred to as "LRU XIs", where LRU stands for least recently used.

In another example, a type of XI requests, referred to as Demote-XIs, transition cache-ownership from exclusive into read-only state, and another type, Exclusive-XIs transition cache ownership from exclusive into invalid state. Demote- and Exclusive-XIs send a response back to the XI sender. The target cache "accepts" the XI, or sends a "reject" response if it first evicts dirty data before accepting the XI. The L1/L2 caches 240 and 268 are store through, but may reject demote- and exclusive XIs if they have stores in their store queues that need to be sent to L3 272 before down-grading the exclusive state. A rejected XI is repeated by the sender. Read-only-XIs are sent to caches that own the line read-only; no response is needed for such XIs since they cannot be rejected. The details of the SMP protocol are very similar to those described for the IBM z10™ by P. Mak, C. Walters, G. Strait, in "IBM System z10 processor cache subsystem microarchitecture," IBM Journal of Research and Development, Vol 53:1, 2009 incorporated herein by reference.

The instruction decode unit (IDU) 208 keeps track of the current transaction nesting depth (TND) 212. When the IDU 208 receives a TBEGIN instruction, the TND 212 is incremented, and conversely decremented on TEND instructions.

The TND 212 is written into the GCT 232 for every dispatched instruction. When a TBEGIN or TEND is decoded on a speculative path that later gets flushed, the IDU's 208 TND 212 is refreshed from the youngest GCT entry that is not flushed. The transactional state is also written into the issue queue 216 for consumption by the execution units, mostly by the Load/Store Unit (LSU). The TBEGIN instruction may specify a TDB (transaction diagnostic block) for recording status information, should the transaction abort before reaching a TEND instruction.

Similar to the nesting depth, the IDU/GCT 208 and 232 collaboratively track the AR/FPR-modification masks through the transaction nest. For example, the IDU 208 places an abort request into the GCT 232 when an AR/FPR-modifying instruction is decoded and the modification mask blocks that.

When the instruction becomes next-to-complete, completion is blocked and the transaction aborts. Other restricted instructions are handled similarly, including TBEGIN if decoded while in a constrained transaction, or exceeding the maximum TND.

An outermost TBEGIN is divided into multiple microops depending on the GR-Save-Mask; each micro-op will be executed by one of the two FXUs 220 to save a pair of GRs into a special transaction-backup register file 228, that is used to later restore the GR content is case of a transaction abort. Also the TBEGIN spawns micro-ops to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op instructions; NTSTG is handled like a store except that it is marked as non-transactional in the issue queue 216 so that the LSU can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Of course program order is restored through the GCT 232 at completion time. The length of transactions is not limited by the size of the GCT 232, since general purpose registers (GRs) can be restored from a backup register file 224.

During execution, the program even recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

The Load/Store Unit tracks cache lines that were accessed during transactional execution, and triggers an abort if an XI from another processor (or an LRU-XI) conflicts with the footprint. If the conflicting XI is an exclusive or demote XI, the LSU rejects the XI back to the L3 272 to finish the transaction before the L3 272 repeats the XI. This "stiff-arming" is very efficient in contended transactions. In order to prevent hangs when two processors stiff-arm each other, a XI-reject counter is implemented, which triggers a transaction abort when a threshold is met.

The L1 cache directory is traditionally implemented with static random access memories (SRAMs). For the transactional memory implementation, the valid bits 244 (64 rows×6 ways) of the directory are moved into normal logic latches, and are supplemented with two more bits per cache line: the TX-read 248 and TX-dirty bits 252.

The TX-read bits 248 are reset when a new outermost TBEGIN is decoded (which is interlocked against a prior still pending transaction). The TX-read bit 248 is set at execution time by every load instruction that is marked "transactional" in the issue queue 216. This leads to overmarking if speculative loads are executed, for example on a mispredicted branch path. The alternative of setting the TX-read bit 248 at load completion time is too expensive for silicon area, since multiple loads can complete at the same time, requiring many read-ports on the load-queue.

Stores execute the same way as in non-transactional mode, but a transaction mark is placed in a store queue (STQ) 260 entry of the store instruction. At write-back time, when the data from the STQ 260 is written into the L1 240, the TX-dirty bit 252 in the L1-directory is set for the written cache line. Store write-back into the L1 240 occurs only after the store instruction has completed, and at most one store is written back per cycle. Before completion and write-back, loads access the data from the STQ 260 by store-forwarding. After write-back, the processor can access the speculatively updated data in the L1 240. If the transaction ends successfully, the TX-dirty bits 252 of all cachelines are cleared, and also the TX-marks of not yet written stores are cleared in the STQ 260, effectively turning the pending stores into normal stores.

On a transaction abort, all pending transactional stores are squashed from the STQ 260, even those already completed. All cache lines that were modified by the transaction in the L1 240, that is, have the TX-dirty bit 252 on, have their valid bits 244 turned off, effectively removing them from the L1 cache 240 instantaneously.

Before completing a new instruction isolation of the transaction read- and write-set is maintained. This is ensured by stalling instruction completion at appropriate times when XIs are pending. Speculative out-of order execution, is thus performed optimistically assuming that the pending XIs are to different addresses and not actually causing a transaction conflict. This design fits with the XI-vs-completion interlocks that are implemented on prior systems to ensure the strong memory ordering that CPU architecture uses.

When the L1 240 receives an XI, it accesses the directory to check validity of the XI'ed address in the L1 240, and if the TX-read bit 248 is active on the XI'ed line and the XI is not rejected, the LSU triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU triggers an abort. Providing the LRU-extension effectively increases the read footprint capability from the L1-size to the L2-size and associativity, provided no conflicts with other CPUs against the non-precise LRU-extension tracking causes aborts.

The store footprint is limited by the store cache size and thus implicitly by the L2 size and associativity. No LRU-extension action needs to be performed when a TX-dirty cache line is LRU'ed from the L1 240.

In example systems, since the L1 240 and L2 268 are store-through caches, every store instruction causes an L3 store access. An example processor with 6 cores per L3 and further improved performance of each core, the store rate for the L3 272 (and to a lesser extent for the L2) becomes problematic for certain workloads. In order to avoid store queuing delays a gathering store cache 264 is added to combine stores to neighboring addresses before sending them to the L3 268.

For transactional memory performance, every TX-dirty cache line from the L1 240 may be killed on transaction aborts, if the L2 cache 272 is very close (for example, 7 cycles L1 miss penalty) to bring back the clean lines. However, performance is below desired levels (and silicon area for tracking is greater) to have transactional stores write the L2 272 before the transaction ends and then invalidate ("kill") all dirty L2 cache lines on abort (or even worse on the shared L3).

The two problems of store bandwidth and transactional memory store handling are both addressed by the gathering store cache 264. In an example, the cache 264 is a circular queue of 64 entries, each entry holding 128 bytes of data with byte-precise valid bits. In non-transactional operation, when a store is received from the LSU, the store cache 264 checks whether an entry exists for the same address, and if so gathers the new store into the existing entry. If no entry exists, a new entry is written into the queue, and if the number of free entries falls under a threshold, the oldest entries are written back to the L2 and L3 caches 268 and 272.

When a new outermost transaction begins, all existing entries in the store cache 264 are marked closed so that no new stores can be gathered into them, and eviction of those entries to L2 268 and L3 272 is started. From that point on, the transactional stores coming out of the LSU STQ allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU requests a transaction abort when the store cache overflows. The LSU detects this condition when it tries to send a new store that cannot merge into an existing entry, and the entire store cache is filled with stores from the current transaction. The store cache 264 is managed as a subset of the L2 268. For example, while transactionally dirty lines can be evicted from the L1 240, they have to stay resident in the L2 268 throughout the transaction. The maximum store footprint, in this example, is thus limited to the store cache size of 64×128 bytes, and is also limited by the associativity of the L2 268. In the example here, since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Server processors, such as IBM™ mainframe server processors contain a layer of firmware called millicode which performs complex functions like certain Complex Instruction Set Computing (CISC) instruction executions, interruption handling, system synchronization, and Remote Administration System (RAS) instructions. In an example, the millicode firmware resides in a restricted area of main memory that customer programs cannot access. When hardware detects a situation to invoke millicode, the instruction fetching unit switches into "millicode mode" and fetches the millicode from the appropriate location in the millicode memory area. Millicode may be fetched and executed in the same way as instructions of the instruction set architecture (ISA), and may include ISA instructions.

For transactional memory, every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs to restore.

In an example, the CPU supports a special millicode-only instruction to read out the backup-GRs and copy them into the main GRs. The TBEGIN instruction address is also loaded from an SPR to set the new instruction address in the PSW to continue execution after the TBEGIN once the millicode abort sub-routine finishes. The PSW may later be saved as program-old PSW in case the abort is caused by a non-filtered program interruption.

The TABORT instruction is millicode implemented; when the IDU 208 decodes TABORT, it instructs the instruction fetch unit to branch into TABORT's millicode, from which millicode branches into the common abort sub-routine.

In an example, the Extract Transaction Nesting Depth (ETND) instruction is also millicoded, since it is not performance critical. Millicode loads the current nesting depth out of a special hardware register and places it into a GR. The PPA instruction may also be millicoded. The PPA instruction performs an optimal delay based on the current abort count provided by software as an operand to PPA, and also based on other hardware internal state.

For constrained transactions, millicode keeps track of the number of aborts. The counter is reset to 0 on successful TEND completion, or if an interruption into the OS occurs (since it is not known if or when the OS returns to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs to stop all conflicting work, retry the local transaction, before releasing the other CPUs to continue normal processing. Multiple processors are coordinated to not cause deadlocks, by serialization between millicode instances on different processors.

An increase in the number of central processing unit (CPU) cores on a chip and the number of CPU cores connected to a shared memory has supported growing workload capacity demand. For example, the IBM zEC12™ enterprise server supports operating system images with up to 101 CPUs. The increasing number of CPUs cooperating to process the same workloads puts significant burden on software scalability; for example, shared queues or datastructures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU's frequency, the latency of hardware interconnects is limited by the physical dimension of the chips and systems, and by the speed of light.

Thus, to take advantage of multiple processors in the CPU by using the transactional memory, a program specifies that a particular sequence of instructions (such as, to update an entry in a shared table) be executed as a transaction. The hardware, in response, buffers the results from this sequence, keeping them from being observed by other processors, and will monitor any activity by other processors that could affect the results of this sequence. If all of the operations inside a transaction can be done without detecting any conflicts, the results are made visible to other processors; otherwise, the results are thrown out and the program can either retry or use a traditional locking algorithm, such as based on mutex, semaphores and such.

Thus, the hardware provides an all-or-nothing characteristic of transactions, that is either the whole transaction occurs as one atomic operation, or none of it occurs. In a program that shares data structures are rarely contented, transactional memory allows parallel programs to selectively avoid semaphore usage and realize multiprocessor benefits without suffering from lock-based overheads. This capability is exploited by software, such as operating systems, middle-ware systems, and applications, based on the multi-processor scaling.

The transactional memory sequence generally denotes all memory accesses within such transaction be atomic with each other. In order to enforce such atomicity, the cache subsystem of a multiprocessor provides hardware structures to keep track of all the memory locations that have been accessed throughout the transaction. In general, these locations are kept at the granularity of a cache line, and then be tracked by the cache subsystems (such as the local L1). The cache subsystems utilize the general cache coherency protocol within the computing system to maintain and enforce atomicity of each transaction. Before a transaction is completed, if any accessed location (i.e. read usage) is modified by another processing thread (or processor core), a transaction can no longer maintain atomicity and will therefore abort. Similarly, if any pending memory updates (i.e. write usages) are forced to be made visible to another thread (or core) or be backed-off due to cache subsystem conflicts before a transaction can be completed, the transaction will abort. In addition, if the cache subsystem can no longer track a particular access, such as the transaction footprint is larger than what is supported in the hardware, the transaction will also abort.

In another example processor, such as AMD's ASF™ extension w/ the LOCK prefix, a transactional memory sequence denotes a region of code to be within the transaction, and then specifies which instructions (and thus their memory accesses) are to be treated as part of the atomic view. In such cases, during a hardware transactional processing, all memory accessed inside a transaction requires tracking and backup structures to provide atomicity within the cache subsystem and therefore is subject to limitations. One limitation is that the maximum size of atomic footprint that is supported, in terms of number of bytes, or number of cache lines, or the like, depending on the processor's design, such that if the size is larger than supported, the transaction will abort. Alternatively or in addition, a limitation may be due to conflicts on cache associativity management, such that when a cache line being used in a transaction is replaced by another line that missed the case causes a transaction to abort, if the replaced line can no longer be tracked by that specific cache structure. Another limitation may be due to cache coherency subset rules, such that a next level cache (such as L2) is a superset of a current level cache (such as L1). As an example, when the L2 replaces a cache line for a cache miss, it might need to invalidate the line from its cache, and may also invalidate that same line from L1. If this line is currently being used in a transaction, the transaction will abort. Besides multiple processors effects that were briefly described earlier, transaction can inadvertently be aborted due to such limitations.

Since microprocessor instruction processing and operand accesses are highly speculative in nature, instructions that are fetched, decoded, executed can be on predicted instruction paths generated by the processor's branch prediction and instruction prefetching mechanisms. In addition, the multiprocessor, by using operand prefetching, attempts to access memory ahead of actual consumption. In such out-of-order processing capable processors, speculative memory accesses are initiated in anticipation of instructions, which are located after a transaction and while the multiprocessor is still working inside a transaction. Such "outside transaction" memory accesses cause cache misses and potentially cause cache management resulted transactional conflicts as described herein, and lead to transaction aborts.

For example, the out-of-order implementation described herein enables the processors to execute instructions outside a transaction while the instructions inside the transaction are still in the process of being implemented. Such an overlap causes the transaction to abort due to cache access conflicts, footprint overloads, or other resource constrains. The technical solutions described herein, facilitates the processor to implement a hardware flush for an instruction and/or a memory access after the end of the transaction. Thus, upon detection of a potential abort condition, the processor automatically flushes the instruction and/or memory access after the transaction ending instruction. The processor further prevents future speculative execution of instructions after the transaction ending instruction.

In an example, while in a transaction, the processor detects the outermost transaction end instruction being decoded and dispatched; thus knowing the corresponding identifier of that instruction in the instruction stream. Upon detecting that there is a conflict that might cause an abort, flush logic in the processor flushes all instructions after this outermost TEND instruction, as referenced by the identifier, thus releasing any resources currently reserved for the execution of instructions outside of the transaction.

Figure 4:
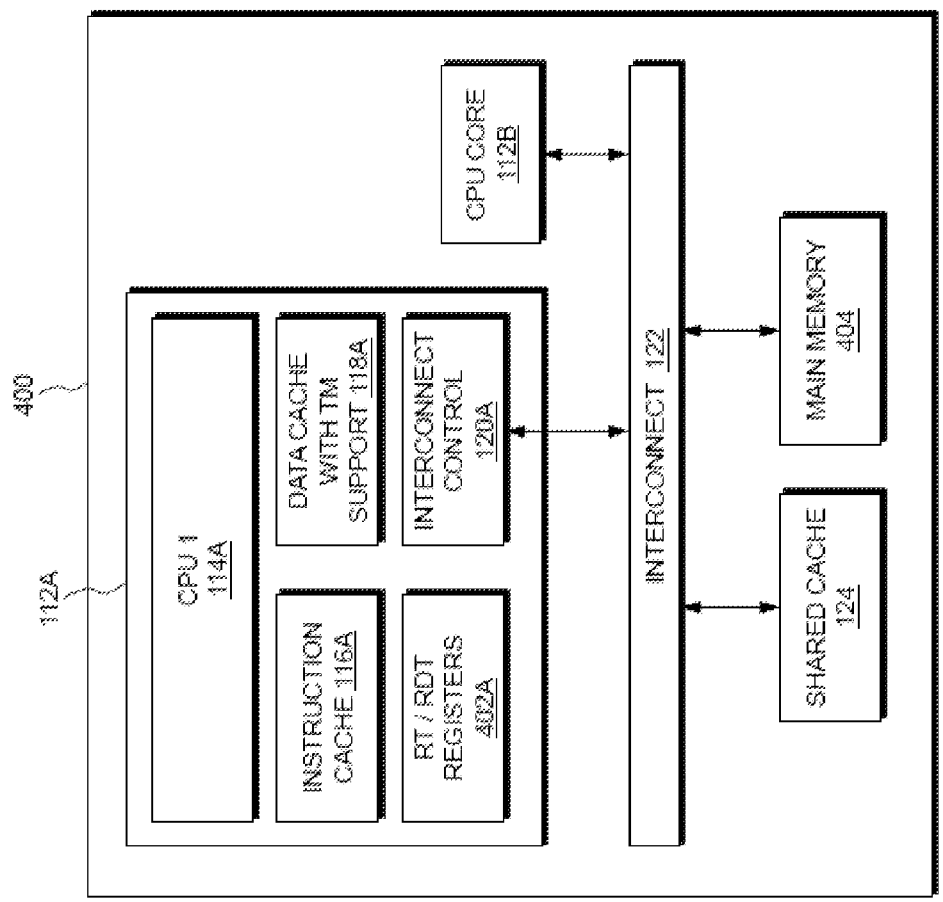
FIG. 4 illustrates an example multiprocessor in accordance with an embodiment.

FIG. 4 illustrates an example multiprocessor 400 according to technical solutions described herein. The multiprocessor 400 includes multiple processor cores 112A and 112B. Of course, in other examples the multiprocessor 400 includes more processing cores than illustrated. Each processor core, such as the processor core 112A along with the instruction cache 116A, the data cache 118A, the interconnect control 120A, includes RT/RDT registers 402. The multiple processor cores are connected via the interconnect 122, which is connected to the shared cache 124 and main memory 404.

Consider an example program, described in Table 4, being executed by the multiprocessor 400. The program includes a transaction (instructions enclosed by TBEGIN and TEND) that atomically adds values in add1, addr2, addr3 and add4 and stores the result into addr1. The transaction is followed by further instructions, in this case the next instruction is to load a value from register R6 into addr5.

TABLE 4

```
XR R5, R4 (exclusive OR R5 to itself, set to 0)
TBEGIN (beginning of a transaction)
    L R1, addr1 (load R1 from storage at location "addr1")
    L R2, addr2 (load R2 from storage at location "addr2")
    L R3, addr3 (load R3 from storage at location "addr3")
    L R4, addr4 (load R4 from storage at location "addr4")
    AR R5, R1 (add R1 to R5)
    AR R5, R2 (addr R2 to R5)
    AR R5, R3 (addr R3 to R5)
    AR R5, R4 (addr R4 to R5)
    ST R5, addrl (store R5 to addr1)
TEND (transaction end)
L R6, addr5 (load R6 from storage at location "addr5")
```

Consider that the processor core 112A is assigned to execute the transaction. If addr1, addr2, addr3, addr4 are all of different cache lines but the same congruence class in a 4-way set associative L1 cache, the transaction executes successfully, since each cache line for each address can be contained within the L1. However, if the load from "addr5" (instruction outside the transaction) was processed out of order, and was done ahead of time, it leads to a transaction abort. Consider a case in which addr1 to addr5 are all going to miss the L1, and the processor 112A sends cache misses in the following order: addr1, addr2, addr3, addr5, then addr4. A traditional cache design, as known to those skilled in the art, addr4 will pick the cache line of addr1 to be replaced (as an LRU entry). Consequently, when addr1 is replaced, the transaction will abort, since the L1 cache can no longer contain addr1.

Consider another case, in which the cache misses occur in the order, addr1, addr2, addr3, and addr4, but addr1 is obtained as read-only (shared). In this case, addr5 will try to LRU either addr1, 2, 3, or 4 before the store (ST) to addr1 occurs, which leads to another cache miss protocol handling to change addr1 ownership from read-only (shared) to exclusively owned before the store can complete (for a store-allocate design). In this case, the processor 112A may hang if the transaction protects miss of addr5 from removing addr1 (which will abort the transaction), but miss of addr5 prevents addr1 from being treated as a miss to obtain exclusive ownership.

As will be obvious to person skilled in the art, other potential problems include unexpected branch prediction after the transaction that might cause further expected footprint conflicts, or other resource limitations during processing of the instructions in this example.

Consider another example program illustrated in Table 4. In this case, the transaction ends and then the program branches to an address Y that is dependent on value of R5 that contains instructions to perform additions. In an example, the processor 112A predicts the branch (BRC) incorrectly, since the address Y is dependent on R5, and the resolution is still waiting for miss return on addr3 to R3. In an out of order execution, the processor 112A continues executing down a predicted (but incorrect) path, and consider that an instruction at address Y' (instead of Y) is executed. The processor 112A, in this case executes the other instructions in the instruction stream, and potentially causes an abort, for example, by fetching another cache line addr5 which will LRU out addr1 (similar to earlier example described herein).

TABLE 4

```
XR R5, R4 (exclusive OR R5 to itself, set to 0)
TBEGIN (beginning of a transaction)
    L R1, addr1 (load R1 from storage at location "addr1")
    L R2, addr2 (load R2 from storage at location "addr2")
    L R3, addr3 (load R3 from storage at location "addr3")
    L R4, addr4 (load R4 from storage at location "addr4")
    AR R5, R3 (addr R3 to R5)
TEND
BCR Y
Y       AR R5, R1 (add R1 to R5)
        AR R5, R2 (addr R2 to R5)
        AR R5, R3 (addr R3 to R5)
        AR R5, R4 (addr R4 to R5)
Y'      L R6, addr5 (load R6 from storage at location "addr5")
        Other instructions
```

Thus, in a system such as the multiprocessor 400 where multiple level of shared caches are provided, these "outside" transaction misses can cause cache misses in the shared cache 124 leading to the request of removing cache lines from the local cache (subset rule) and potentially lead to unexpected aborts. In addition, or alternatively cases in which the processor aborts a transaction due to conflicts due to out of order execution of instructions after a Transaction-end include, but are not limited to, exhausting all store queue entries, load queue entries, or running out of instruction tracking resources, detecting the storing into instruction stream, and others.

Figure 5:
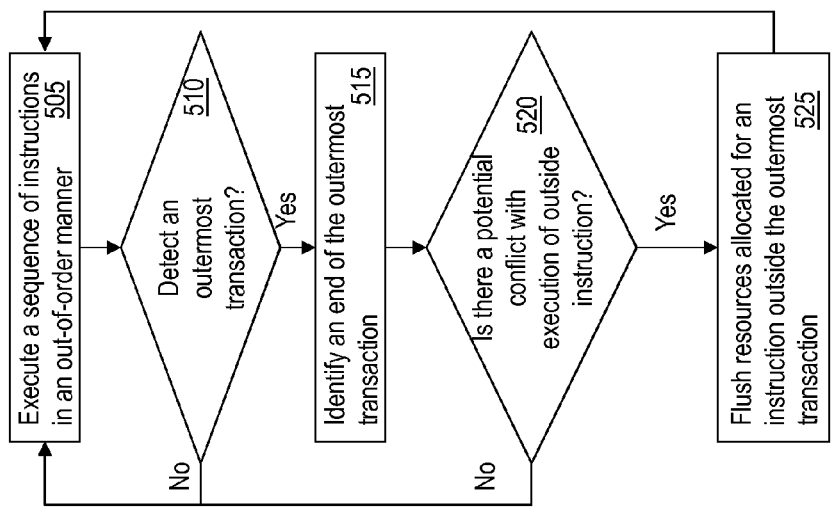
FIG. 5 illustrates a flowchart for avoiding a transaction abort in accordance with an embodiment.

FIG. 5 illustrates a flowchart for avoiding the transaction abort according to an example embodiment. The multiprocessor 400 implements the logic represented in the flowchart. The multiprocessor 400 executes a stream of instructions, as shown at block 505. The multiprocessor 400 may execute the instructions in an out-of-order manner and in parallel across multiple cores. In an example, the processor 112A during the execution detects an outermost transaction, as shown at block 510. For example, the processor 112A detects a transaction-end instruction or keyword, such as the TEND instruction being decoded and dispatched. The multiprocessor 400 keeps track of an identifier of the transaction-end instruction in the instruction stream, such as the location (address) of the transaction-end in the instruction stream.

In another example, the processor 112A detects the transaction based on a transaction beginning keyword or instruction, for example a TBEGIN instruction, being decoded and dispatched. The processor 112A identifies an outermost transaction end instruction (such as TEND) corresponding to the transaction begin instruction being decoded and dispatched; thus knowing the corresponding identifier of that instruction in the instruction stream, as shown at block 515.

The multiprocessor 400 determines a potential conflict that might cause the transaction to abort, as shown at block 520. For example, the multiprocessor 400, based on the location of the transaction-end, determines if an instruction outside the transaction is being executed prior to the completion of the transaction based on an address of the outside instruction being greater than (or lower than in case the addresses are in descending order) the transaction-end instruction. The multiprocessor 400 further determines if a cache miss can occur due to execution of the outside instruction in an out-of-order manner, prior to completion of the transaction. The multiprocessor 400 also detects for types of conflicts, other than cache miss, that can lead to a transaction abort. If the multiprocessor 400 does not detect a potential conflict, the multiprocessor 400 continues execution of the outside instruction in parallel with the transaction. Else, if the multiprocessor detects a potential conflict, the multiprocessor activates a flush logic for the instruction outside the transaction, as shown at block 525. In an example, the flush logic flushes all instructions after the identified outermost transaction-end instruction or keyword. For example, the processor 112A stores an identifier of the transaction-end instruction and the multiprocessor releases any resources, such as cache lines, currently reserved for execution of an instruction outside of the transaction-end identifier.

Figure 6:
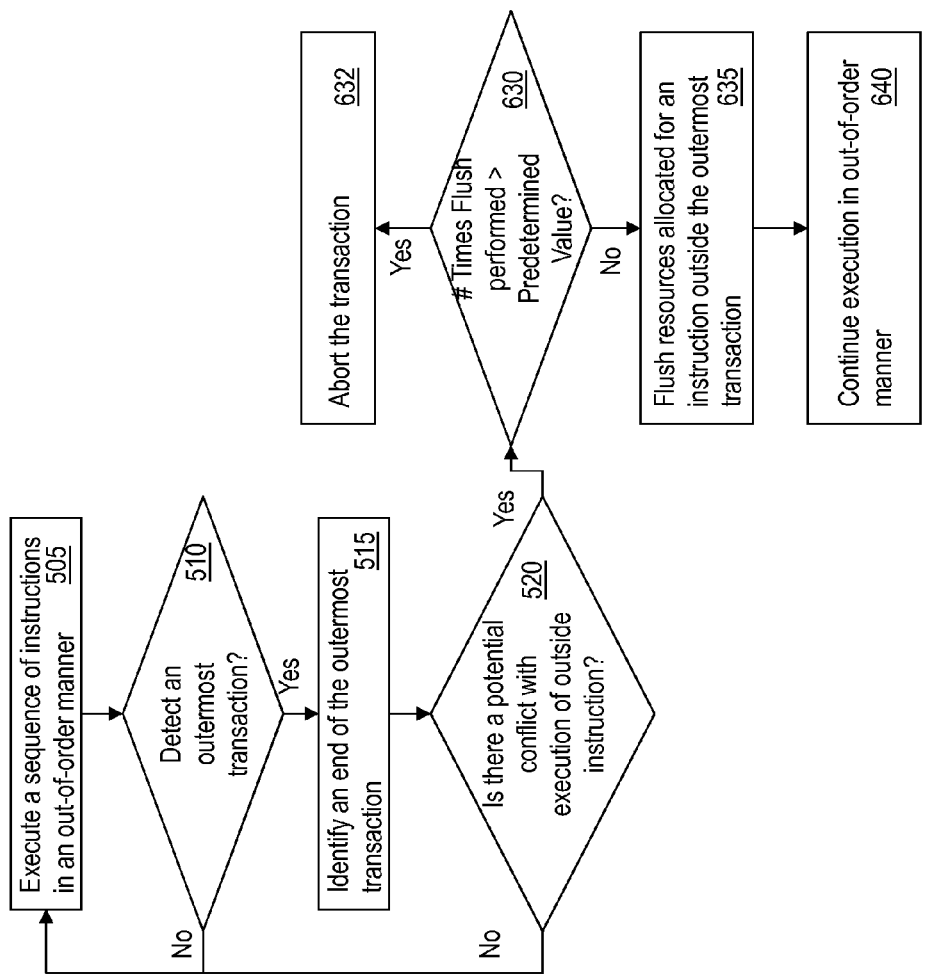
FIG. 6 illustrates a flowchart for avoiding a transaction abort in accordance with an embodiment.

FIG. 6 illustrates a flowchart for avoiding the transaction abort according to an example embodiment. In this case the multiprocessor 400 flushes the instructions outside the transaction for a predetermined number of times. For example, the multiprocessor 400 keeps track of a number of times a flush is performed for a particular transaction upon identification of a potential conflict. For example, the multiprocessor 400 maintains a counter that is incremented every time a flush is performed. The multiprocessor 400 resets the counter to zero (0) once the transaction either completes successfully or aborts. The multiprocessor 400 compares the number of times the flush has been performed with a predetermined value, as shown at block 630. If the predetermined value has been surpassed, the multiprocessor may abort the transaction, as shown at block 632. Otherwise, the multiprocessor 400 continues to flush the instruction(s) outside the transaction and proceeds to continue the execution of the instruction stream and the transaction, in an out-of-order manner, as shown at blocks 635 and 640. The predetermined value, in an example, may be one (1), thus causing the multiprocessor 400 to try and avoid the transaction abort once, before proceeding to abort the transaction. By flushing the instruction outside the transaction once, or any other predetermined number of times, the multiprocessor 400 facilitates a delay for the transaction to complete execution, prior to completion of the outside instruction. The multiprocessor 400, in other examples, may retry flushing more than once by configuring the predetermined value to more than one, for example 2, 5, 10, or any other number.

In an example, when the corresponding instruction for a cache miss is flushed, the miss request is canceled in the cache hierarchy. For example, the cache miss may be canceled by forcing of an exception during dynamic address translation (DAT). Subsequently, the cache system 124 sets a cancel signal to the storage subsystem and the storage subsystem sends a false exception signal to the cache system 124. The cache miss may be canceled in another manner in different examples.

Figure 7:
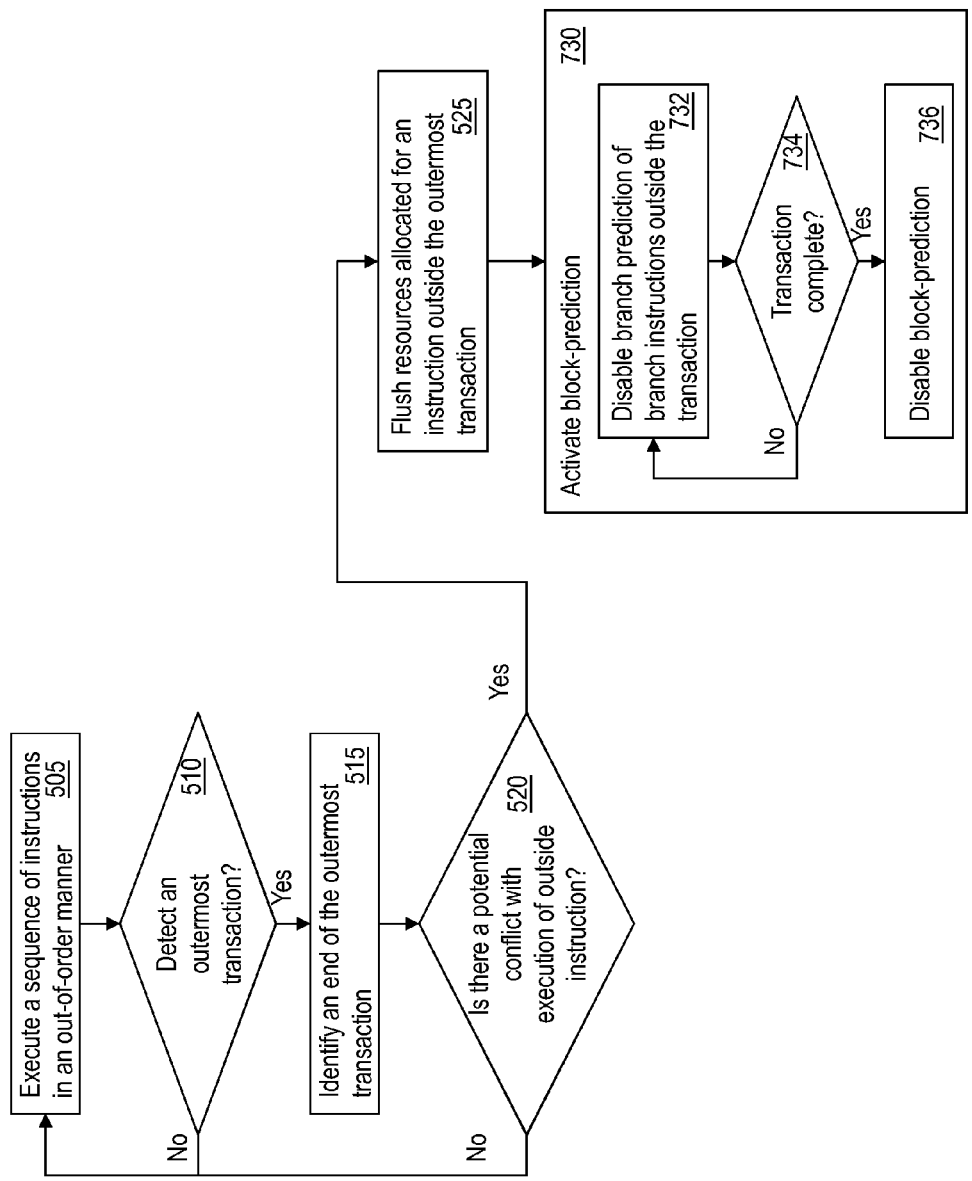
FIG. 7 illustrates a flowchart for avoiding a transaction abort in accordance with an embodiment.

FIG. 7 illustrates a flowchart for avoiding the transaction abort according to an example embodiment. In this case, the multiprocessor 400, after a flush is performed activates a "block-prediction" scheme as shown at block 730. While the block-prediction is activated, the multiprocessor disables prediction of branch instructions that are after the outermost transaction-end instruction once a flush has been performed, as shown at block 732. This lessens the chance of executing unexpected code stream during execution of the transaction. Branch prediction is re-enabled after the transaction ends, as shown at blocks 734 and 736. In an example, the block-prediction is activated after a predetermined number of flushes have been performed as described in an earlier example.

Figure 8:
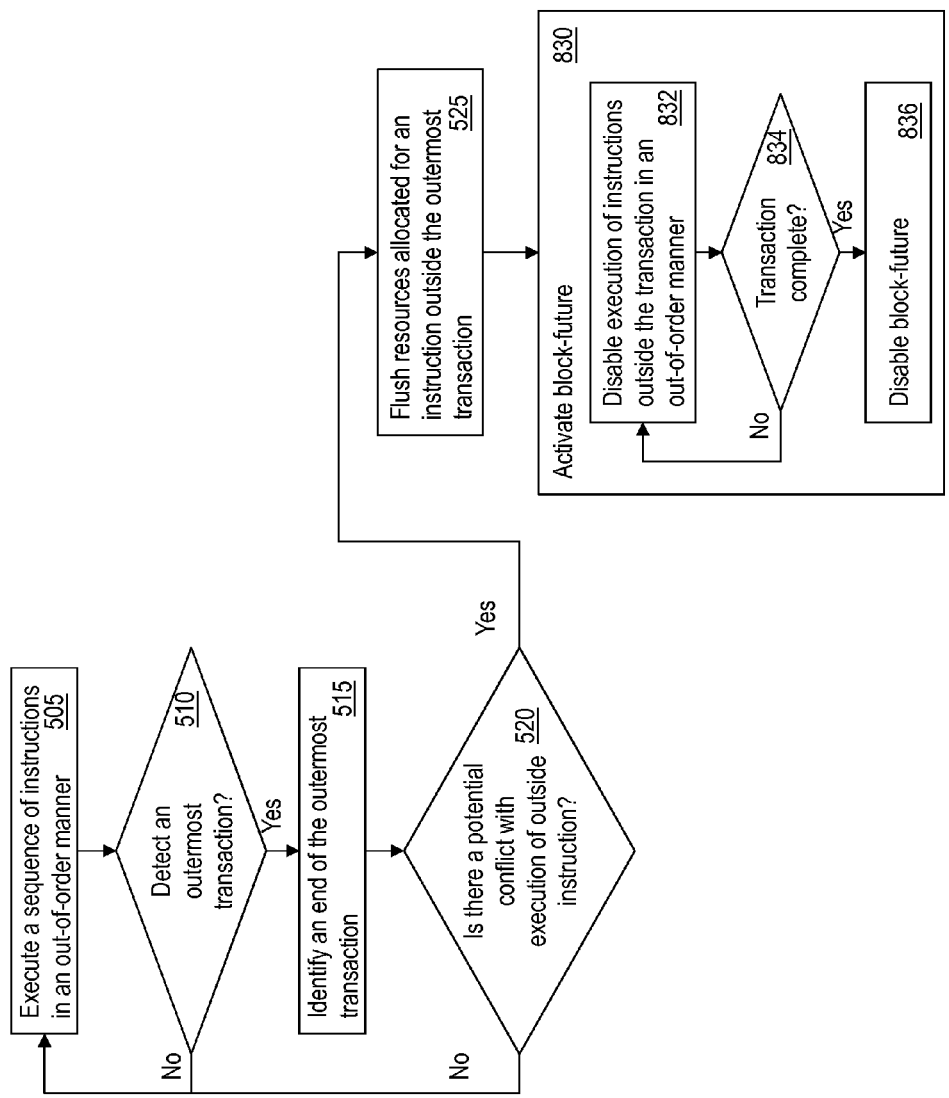
FIG. 8 illustrates a flowchart for avoiding a transaction abort in accordance with an embodiment.

FIG. 8 illustrates a flowchart for avoiding the transaction abort according to an example embodiment. In this case, the multiprocessor 400, after a flush is performed activates a "block-future" scheme as shown at block 830. According to the block-future, the multiprocessor disables issuing instructions after the outermost transaction-end instruction in an out of order manner after a flush, as shown at block 832. Once the transaction completes execution, the multiprocessor disables the block-future and restarts executing instructions outside the transaction in an out-of-order manner, as shown at blocks 834 and 836. In an example, the block-future is activated after a predetermined number of flushes have been performed as described in an earlier example.

Figure 9:
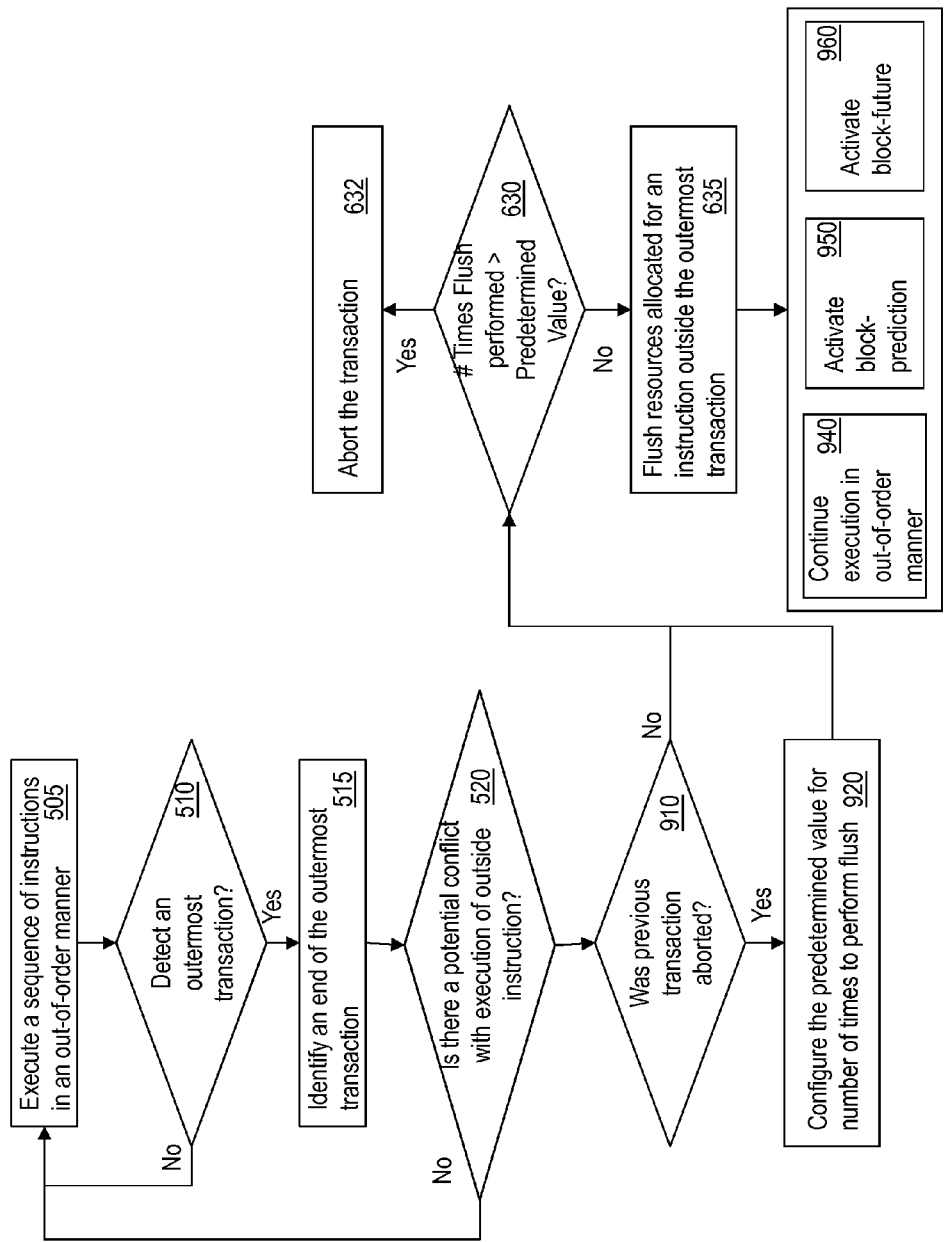
FIG. 9 illustrates a flowchart for avoiding a transaction abort in accordance with an embodiment.

FIG. 9 illustrates a flowchart for avoiding the transaction abort according to an example embodiment. In this example, the multiprocessor keeps track of a status of execution of a previous transaction. Upon detection of a potential conflict, as shown at block 520, the multiprocessor checks if the previous transaction was aborted, as shown at block 910. If the previous transaction was not aborted, the multiprocessor 400 uses a default predetermined value as a maximum number of times to flush an instruction outside the transaction. Else, the multiprocessor 400 reduces the predetermined value, if the previous transaction was aborted, as shown at block 920. For example, if the default predetermined value is 5, and the previous transaction was aborted, the multiprocessor 400 reduces the predetermined value to 4. In another example, the predetermined value may be reduced by more than 1, such as by 2 or any other predetermined reduction value. The multiprocessor resets the predetermined value to the default value once the transaction executes successfully or aborts. As illustrated, the multiprocessor 400 uses the configured predetermined value, either the default or the reduced, based on the status of the previous transaction execution, to determine whether to perform another flush or to abort the current transaction, as shown at blocks 630, 632, and 635. As illustrated, the multiprocessor 400, in case of the previous transaction being aborted, may either proceed to execute the instructions in an out-of-order-manner, activate a block-predication scheme, or activate a block-future scheme, as described in earlier examples, and as shown at blocks 940, 950, and 960. Thus, instead of activating the flush upon detecting a conflict, the multiprocessor 400 remembers that an immediately prior transaction was aborted, and reduces the predetermined value when encountering the next transaction. This assumes that the program is retrying the transaction at least once after an abort. In an example, instead of reducing the predetermined value, the predetermined value is set to a count of a number of times a store queue or load queue resource using instruction is rejected due to pending instructions usage, or to a number of times a cache miss is rejected due to pending cache misses or any other such value.

The examples described herein facilitate a multiprocessor to avoid a transaction abort during execution of an instruction stream in an out-of-order manner. The multiprocessor performs a hardware flush for an instruction and/or memory accesses after the transaction ending instruction. In an example, upon detection of potential abort conditions, the flush logic automatically kicks in, and flushes an instructions after the outermost transaction-end. In another example, the flush logic prevents future speculative execution of instructions after the transaction-end.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for avoiding a transaction abort in a multiprocessor that supports transactional memory during out-of-order execution of an instruction stream, the method comprising:
   detecting an instruction that represents an end of a transaction in the instruction stream;
   identifying a conflict in execution of an outside instruction in conjunction with execution of the transaction, the outside instruction being after the instruction that represents the end of the transaction, and wherein the conflict causes the transaction to abort; and
   in response to identifying the conflict:
      incrementing a counter that tracks a number of times a flush has been performed during execution of the transaction;
      comparing the counter with a predetermined value; and
      in response to the counter being less than the predetermined value, flushing the outside instruction and resuming the execution of the transaction, without aborting the transaction, else aborting the transaction.

2. The method of claim 1, wherein the transaction is a set of instructions that are executed in an atomic manner.

3. The method of claim 1, wherein flushing the outside instruction comprises releasing a resource allocated for execution of the outside instruction.

4. The method of claim 3, wherein the resource allocated is at least one of a cache line, a load queue, and a store queue.

5. The method of claim 1 further comprising, in response to identifying the conflict, and in response to a previous transaction being aborted, reducing the predetermined value.

6. The method of claim 1 further comprising resetting the predetermined value in response to a successful completion of the execution of the transaction.

7. The method of claim 1 further comprising blocking prediction of branch instructions that are after the instruction that represents the end of the transaction until the execution of the transaction completes, in response to flushing the outside instruction.

8. The method of claim 1 further comprising blocking out-of-order execution of instructions that are after the instruction that represents the end of the transaction until the execution of the transaction completes, in response to flushing the outside instruction.

9. A system comprising:
   a multiprocessor that supports transactional memory during out-of-order execution of an instruction stream and avoids a transaction abort during the out-of-order execution of the instruction stream, wherein the multiprocessor is configured to:
   detect an instruction that represents an end of a transaction in the instruction stream;
   identify a conflict in execution of an outside instruction in conjunction with execution of the transaction, the outside instruction being after the instruction that represents the end of the transaction, and wherein the conflict causes the transaction to abort; and
   in response to identifying the conflict:
      increment a counter that tracks a number of times a flush has been performed during execution of the transaction;
      compare the counter with a predetermined value; and
      in response to the counter being less than the predetermined value, flush the outside instruction and resume the execution of the transaction, else abort the transaction.

10. The system of claim 9, wherein the transaction is a set of instructions that are executed in an atomic manner.

11. The system of claim 9, wherein a flush of the outside instruction comprises release of a resource allocated for execution of the outside instruction.

12. The system of claim 11, wherein the resource allocated is at least one of a cache line, a load queue, and a store queue.

13. The system of claim 9, wherein the multiprocessor is further configured to,
   in response to identifying the conflict, and in response to a previous transaction being aborted, reduce the predetermined value; and
   reset the predetermined value in response to a successful completion of the execution of the transaction.

14. The system of claim 9, wherein the multiprocessor is further configured to block prediction of branch instructions that are after the instruction that represents the end of the transaction until the execution of the transaction completes, in response to flushing the outside instruction.

15. The system of claim 9, wherein the multiprocessor is further configured to block out-of-order execution of instructions that are after the instruction that represents the end of the transaction until the execution of the transaction completes, in response to flushing the outside instruction.

16. A computer program product for avoiding a transaction abort in a multiprocessor that supports transactional memory during out-of-order execution of an instruction stream, the computer program product comprising a computer readable storage medium, the computer readable storage medium comprising computer executable instructions, wherein the computer readable storage medium comprises instructions to:
   detect an instruction that represents an end of a transaction in the instruction stream;
   identify a conflict in execution of an outside instruction in conjunction with execution of the transaction, the outside instruction being after the instruction that represents the end of the transaction, and wherein the conflict causes the transaction to abort; and
   in response to identifying the conflict:
      increment a counter that tracks a number of times a flush has been performed during execution of the transaction;
      compare the counter with a predetermined value; and
      in response to the counter being less than the predetermined value, flush the outside instruction and resume the execution of the transaction, else abort the transaction.

17. The computer program product of claim 16, wherein the computer readable storage medium further comprises instructions to block prediction of branch instructions that are after the instruction that represents the end of the transaction until the execution of the transaction completes, in response to flushing the outside instruction.

18. The computer program product of claim 16, wherein the computer readable storage medium further comprises instructions to, reduce the predetermined value in response to identifying the conflict and in response to a previous transaction being aborted.

19. The computer program product of claim 16, wherein the computer readable storage medium further comprises instructions to reset the predetermined value in response to a successful completion of the execution of the transaction.

* * * * *